United States Patent [19]
Augeri et al.

[11] Patent Number: 4,791,508
[45] Date of Patent: Dec. 13, 1988

[54] MAGNETIC DISC MEMORY UNIT

[75] Inventors: James A. Augeri; Carl Bolz, both of Middletown; Bruce Bickford, Chester; Paul Young, Cromwell; David Johnson, Portland, all of Conn.

[73] Assignee: Raymond Engineering Inc., Middletown, Conn.

[21] Appl. No.: 96,978

[22] Filed: Sep. 14, 1987

Related U.S. Application Data
[63] Continuation of Ser. No. 821,101, Jan. 21, 1986.

[51] Int. Cl.⁴ .................. G11B 17/02; G11B 21/22; G11B 21/08
[52] U.S. Cl. .................................. 360/99.12; 360/75; 360/105; 360/106; 360/78.13
[58] Field of Search .................... 360/106, 105, 97–99, 360/75

[56] References Cited

U.S. PATENT DOCUMENTS

| | | | |
|---|---|---|---|
| 3,713,121 | 1/1973 | Fasano et al. | 360/105 |
| 3,772,666 | 11/1973 | Scholz et al. | 360/105 |
| 4,323,939 | 4/1982 | Iftikar et al. | 360/106 |
| 4,371,903 | 2/1983 | Lewis | 360/75 |
| 4,488,192 | 12/1984 | Treseder | 360/98 |
| 4,514,837 | 4/1985 | Van Rosmalen | 360/106 |
| 4,519,010 | 5/1985 | Elsaesser et al. | 360/98 |
| 4,535,374 | 8/1985 | Anderson et al. | 360/105 |
| 4,626,942 | 12/1986 | Shoji et al. | 360/75 |
| 4,633,350 | 12/1986 | Hanson | 360/98 |

Primary Examiner—Robert S. Tupper
Attorney, Agent, or Firm—Fishman, Dionne & Cantor

[57] ABSTRACT

A magnetic disc memory unit is presented wherein a pair of read/write heads are attached to and driven by a continuous belt driven by a stepper motor. The read/write heads move linearly, and they retract to a landing position fully off the disc when the unit is shut down. The heads carriage structure is counterbalanced by a counterbalance assembly to allow operation at all altitudes and minimize vibration and shock problems.

24 Claims, 5 Drawing Sheets

MAGNETIC DISC MEMORY UNIT

This application is a continuation, of application Ser. No. 821,101, filed 1/21/86.

BACKGROUND OF THE INVENTION

This invention relates to the field of magnetic disc memory units. More particularly this invention relates to a ruggedized magnetic disc memory unit suitable for use in hostile or severe environments and capable of withstanding loads or stresses, such as shock, vibration, and which is capable of operation at any altitude. The unit of the present invention is particularly suitable for use in military applications, but it may also find use in other demanding environments, such as, for example, oil and gas well drilling and seismic exploration.

Both magnetic tape recorder units and magnetic disc memory units have been known in the art for many years. Tape units suitable for use in demanding applications are available, but a need exists for an improved disc unit. The present invention is directed to that need in its configuration which results in an improved magnetic disc memory unit.

BRIEF DESCRIPTION OF THE DRAWINGS

Referring now to the drawings, wherein like elements are numbered alike in the several figures.

DESCRIPTION OF THE PREFERRED EMBODIMENT

Figure 1:
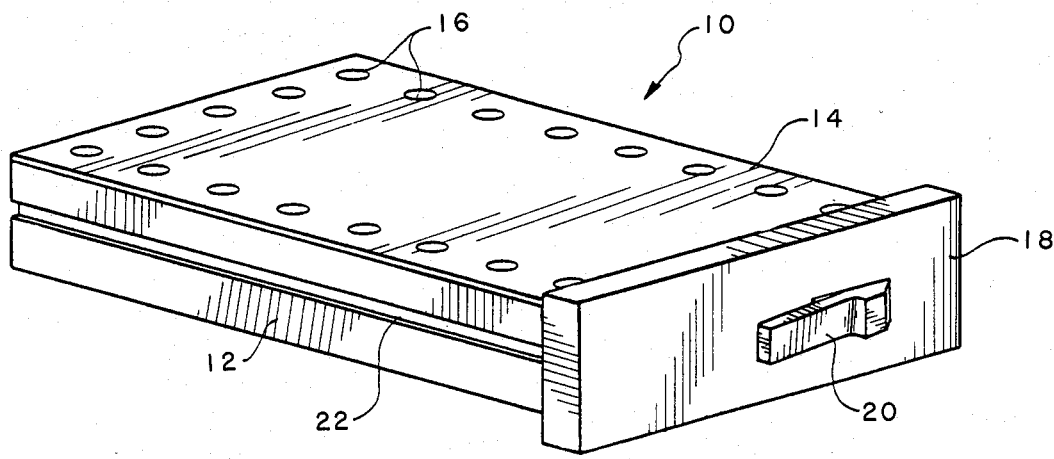
FIG. 1 is a perspective view of the exterior casing or housing of the magnetic disc unit of the present invention.

Referring now to FIG. 1, the exterior housing for the unit of the present invention is shown. Housing 10 has a main housing section 12 with a removable cover plate 14 which is fastened to main housing section 12 with a plurality of screw fasteners 16. Housing section 12 and cover plate 14 are of metal, preferably aluminum. A front cover 18 is attached to housing section 12, and cover 18 has a release latch mechanism 20 for locking the housing into or releasing it from a vibration cradle (not shown) equipped with shock mounts in which the unit would be mounted. Housing section 12 has a mounting slot 22 along the length of its two opposite sides, and these grooves mate with corresponding runners or guides in the cradle. To insure that the unit is properly mounted in the cradle (and to insure proper alignment with electrical connectors on the back end of the unit), the grooves are offset on the two sides of the unit (as are the mating guides in the cradle). Since the grooves and mating guides are asymmetric, the unit can only be mounted in one position (i.e., the proper one) in the cradle.

Figure 4:
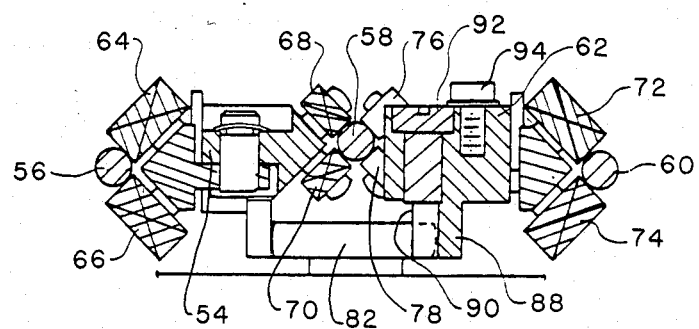
FIG. 4 is a partial sectional elevation view taken along line B—B of FIG. 2.
Figure 2:
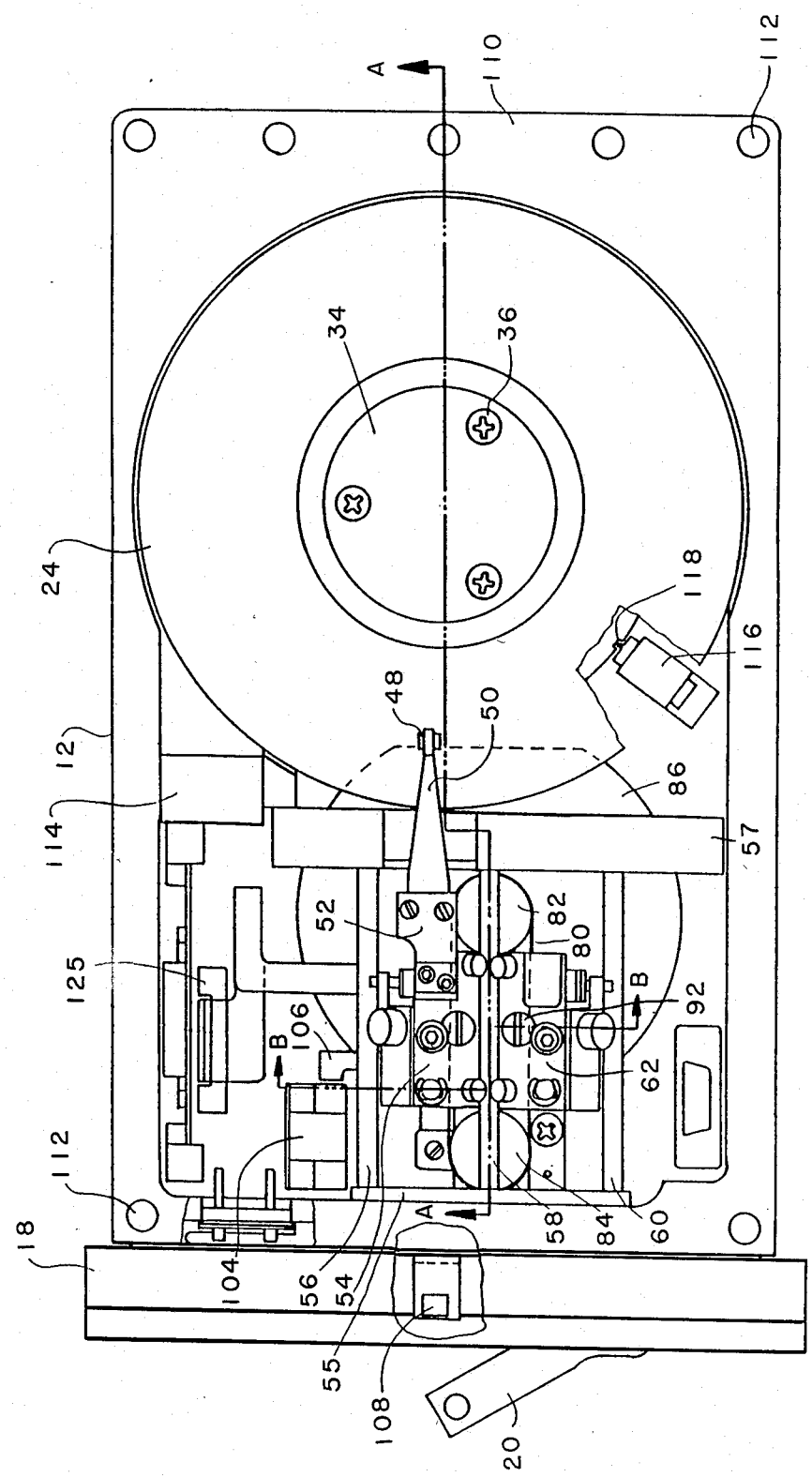
FIG. 2 is a top plan view of the unit of the present invention, FIG. 2 being a top plan view of the unit of FIG. 1 with the top cover removed.
Figure 3:
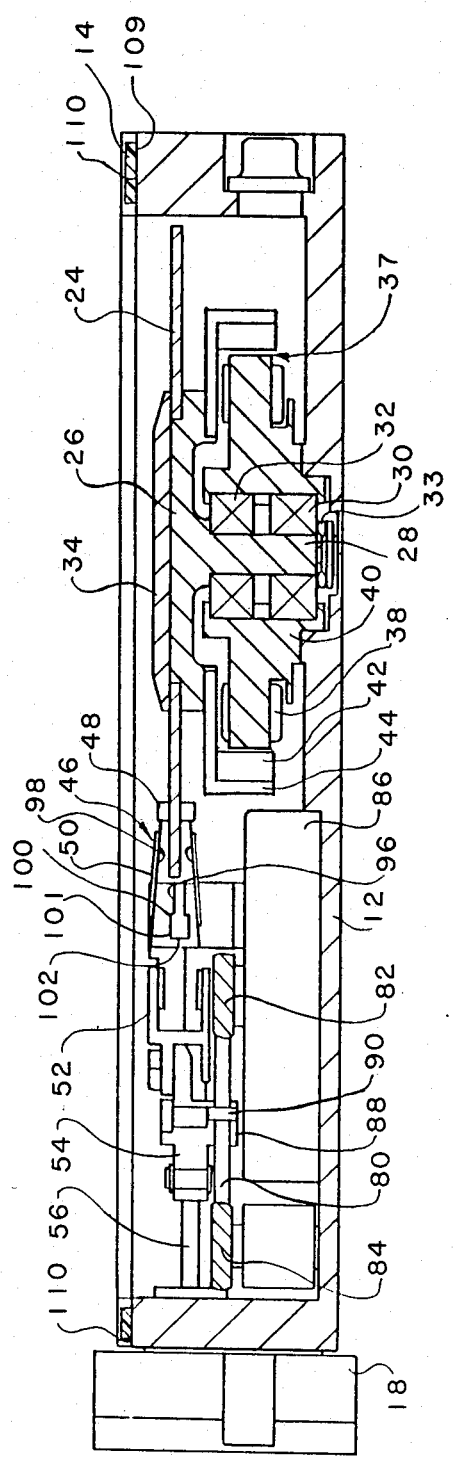
FIG. 3 is a sectional elevation view taken along line A—A of FIG. 2.

Referring now to a combined consideration of FIGS. 2, 3 and 4, the details of the magnetic disc unit of the present invention are seen. A magnetic disc 24 (which is, per se, known in the art) is mounted on a rotary plate or table 26 from which extends a rotary spindle 28. Spindle 28 is mounted and supported in bearings 30 and 32, preferably via an elastomeric member 33. Magnetic disc 24 is locked to rotary table 26 by a top plate 34 which is releasably fastened to table 26 by screws 36. As best seen in FIG. 3, top plate 34 overlaps the inner edge of a central opening in disc 24 to lock the disc to table 26. Table 26 is driven by a motor 37, the stator 38 of which is mounted on housing segment 40 and the rotor 42 of which is mounted on a skirt 44 which, in turn, is fastened to rotary table 26. Upon the delivery of electrical power to motor 37, table 26 and disc 24 rotate in either a clockwise or counterclockwise direction as desired, preferably in the counterclockwise direction.

A read/write head mechanism 46 cooperates with both the upper and lower sides of magnetic disc 24 (both sides of which may contain data). The upper and lower read/write head mechanisms are identical, so only one will be described. Read/write head mechanism 46 has a magnetic pickup head 48 which is mounted on the end of a contoured flexure beam 50. Flexure beam 50 is attached to a support plate 52 which, in turn, is attached to a head carriage 54. Flexure beam 50 holds head 48 steady in its position just above but out of contact with disc 24 when the unit is operating; and flexure beam 50 will flex to permit head 48 to be raised or lowered as it moves to and from a home position and an operating position, as will be more fully described hereinafter.

Head carriage 54 is mounted for linear movement on a pair of cylindrical guide rods 56 and 58. The unit also has a third cylindrical guide rod 60; and a counterbalance assembly 62 is mounted for linear movement on guide rods 58 and 60. Guide rods 56, 58 and 60 each extend between and are supported in end plate 55 mounted on the front end of housing section 12 and support block 57 which is mounted on the floor of housing section 12.

As best shown in FIG. 4, head carriage 54 is mounted for linear movement on rod 56 by upper and lower roller bearings 64 and 66 which are rotatably mounted in carriage 54 and engage rod 56 from above and below. Head carriage 54 is also mounted for linear movement on rod 58 by a pair of roller bearings 68, 70 which are rotatably mounted in carriage 54 and engage rod 58 from above and below preferably via an elastomeric member (not shown). Similarly, counterbalance assembly 62 is mounted for linear movement on rod 60 by upper and lower roller bearings 72, 74 which are rotatably mounted in counterbalance assembly 62 preferably via an elastomeric member (not shown); and assembly 62 is also mounted for linear movement on rod 58 by a pair of rollers 76, 78 which are rotatably mounted in assembly 62 and engage rod 58 from above and below also preferably via an elastomeric member (not shown).

As can be seen and understood from the foregoing, head carriage 54 and counterbalance assembly are movable back and forth in linear directions which are radial or parallel to a radial line with respect to disc 24. Also, counterbalance assembly 62 is constructed so that its weight equals the weight of head carriage 54, support plate 52 and flexure beam 50. This balancing of weights provides for static and dynamic balance in the assembly to minimize the effects of shock and vibration.

Head carriage 54 and counterbalance assembly 62 are each attached to a continuous drive belt 80, preferably of stainless steel material. Drive belt 80 extends between and around drive capstan 82 and a rotatable idler 84. A stepping motor 86 drives capstan 82 and moves belt 80 in step increments in response to operating inputs to the stepping motor. Head carriage 54 is attached to one leg of belt 80 and counterbalance assembly 62 is attached to the other leg of belt 80. Thus, head carriage 54 and counterbalance assembly 62 move equal amounts and in opposite directions when the stepping motor is actuated. This equal and opposite action of head carriage 54 and counterbalance assembly 62 contribute to the stability of operation and the shock and vibration resistance of the unit of the present invention.

The head carriage 54 and counterbalance assembly 62 are each attached to drive belt 80 by an identical gripping mechanism, one of which (associated with counterbalance 62) will be described. Belt 80 is gripped between a depending portion 88 of counterbalance 62 and an eccentrically mounted shaft or clamp finger 90 which is is eccentrically mounted on a rotatable screw element 92. Belt 80 passes between clamp finger 90 and depending portion 88, and the belt is gripped and locked between clamp finger 90 and portion 88 when the eccentric is in the actuated or locked position. Conversely, the counterbalance 62 may be released from the belt 80 by rotating screw 92 to rotate eccentric 90 away from depending portion 88. A lock screw 94 overlaps and contacts the head of screw 92 to lock screw 92 and eccentric 90 in the position to engage belt 80.

As can be seen and understood from the foregoing, actuating signals to stepper motor 86 will drive belt 80 and head carriage 54 to accurately position read/write head 48 at a desired position relative to disc 24. When head 48 is in an operative position over disc 24 for reading or writing, the head is close to but spaced from the disc; and, it is important to keep the head spaced from the disc to avoid contact with and damage to the disc. When the disc is spinning, an air cushion or air bearing effect is established between disc 24 and head 48 whereby head 48 operates like a flying head. However, in accordance with the present invention, when the disc 24 is not rotating (or if retraction of the head is programmed) the head 48 is retracted to a "home" or "reference" position where it is stored on a landing pad 96 to both store and protect the head. When rotation of the disc stops for any reason, stepper motor 86 operates to drive belt 80 in the direction to move head carriage 54 away from disc 24. As the head assembly is retracted, a cam follower 98 (cam follower 98 having a preferably spherical or semispherical shape) on the underside of flexure beam 50 contacts the leading step edge 100 of a step element 101 whereby head 48 is lifted away from disc 48 (i.e., moved in a direction perpendicular to disc 48). It will be appreciated that a cam follower 98 with a spherical or semi-spherical shape will have the necessary abrupt angle change which will permit the head 48 to be quickly raised and lowered over a relatively short linear distance. With further retraction, motion of the read/write mechanism and head 48 moves parallel to disc 24 (with head 48 spaced from the disc) and then cam follower 98 drops behind the trailing edge 102 and head 48 moves perpendicularly downward to a rest position on landing pad 96. Similarly, when signals are delivered to stepper motor 6 to move the read/write mechanism to the operating position to position head 48 over disc 24, cam follower 98 will contact trailing edge 102 to lift head 48 perpendicularly upward off landing pad 96; and the read/write mechanism and head 48 then move parallel to disc 48 with head 48 spaced considerably above disc 24; and then head 48 moves perpendicularly downward to its operating position just away from the surface of disc 24 when cam follower 98 drops along leading edge 100 of cam member 101. This portion of head 48 perpendicular to the surface of disc 24 when the head is moved to the retracted or operative positions is a very important feature of the present invention in that it ensures against dragging of the head across the surface of the disc, whereby both the heads and the disc are protected.

The magnetic disc unit has an electro-optic sensor 104 which functions to deactivate the stepper motor when the head carriage 54 and head 48 reach the full retracted position. A flag 106 is attached to head carriage 54. When head carriage 54 approaches the full retracted position, flag 106 enters a slit in sensor 104; and, when carriage 54 and head 48 reach the full retracted position, flag 106 interrupts the optical path in sensor 104 whereby sensor 104 generates an output signal to terminate operation of stepper motor 86 in the retracted direction.

The unit includes a zero index magnetic sensor 116 which interacts with skirt 44 to sense an index notch 118 or other indicator on skirt 44 to determine a "0" index position to coordinate the angular position of the disc with axial movement of head 48. Skirt 44 is comprised of a magnetic material such as iron. Index notch 118 is actually an air gap in the magnetic path (reluctance) at index notch 118. In this way, the angular position of data stored (and readout thereof) and the axial position of head 48 can be coordinated from a reference point for retrieval of desired information.

The unit also includes a feature whereby a power interruption for any reason will result in drawing the head carriage 54 and head 48 to the fully retracted position. The power interruption could be caused by intentional shut down, a power failure, or by actuating front cover latch 20 to the open position which would permit removal of the unit from its cradle. The opening of latch 20 is sensed by a magnetically operated switch 108 which operates to shut down power to the unit. Regardless of the cause of power interruption, the voltage to spindle motor 37 drops to zero. That drop in voltage is sensed in the electronic control unit (FIG. 5); and the spindle motor, which is still spinning, is used as a generator to power both the stepper motor and the stepper motor microprocessor to drive head carriage 54 and head 48 to the full retracted position.

Cover 14 includes a channel 109 along the perimeter thereof as shown in FIG. 3. Channel 109 includes a seal 110 therein, preferably an elastomeric seal. Seal 110 is compressed between cover plate 14 and housing 12 when housing 12 is secured in place so as to hermetically seal the interior space of the unit. (It will be understood that cover plate 14 and housing 12 have matching holes 112 to receive screws 16, only some of these holes being shown in FIG. 2. Holes 112 are preferably positioned to the outside of seal 110.) The interior of the hermetically sealed unit is filled with an inert gas such as freon to establish and maintain a constant environment for the system. The rotary movement of disc 24 establishes a current or circulating flow of the freon gas in the sealed unit, and the gas flows through an internal filter 114 to constantly filter out any contaminants that may appear in the gas (such as from the disc or any other component in the system). The combination of hermetic sealing and an internal filter establishes a particularly stable and contaminant free environment.

For convenience of assembly, disassembly and repair, the unit is modularized. The rotary table 26, spindle 28, top 34 and motor 37 constitute one module; the entire read/write mechanism (head 48, beam 50, plate 52), head carriage 54, counter balance assembly 62, guides 56, 58, 60, stepper motor 86, and end plate 55 and support block 57 constitute another module; housing 12, cover 14 and seal 110 constitute another module; and front cover 18 with latch 20 and switch 108 constitutes another module.

Figure 5:
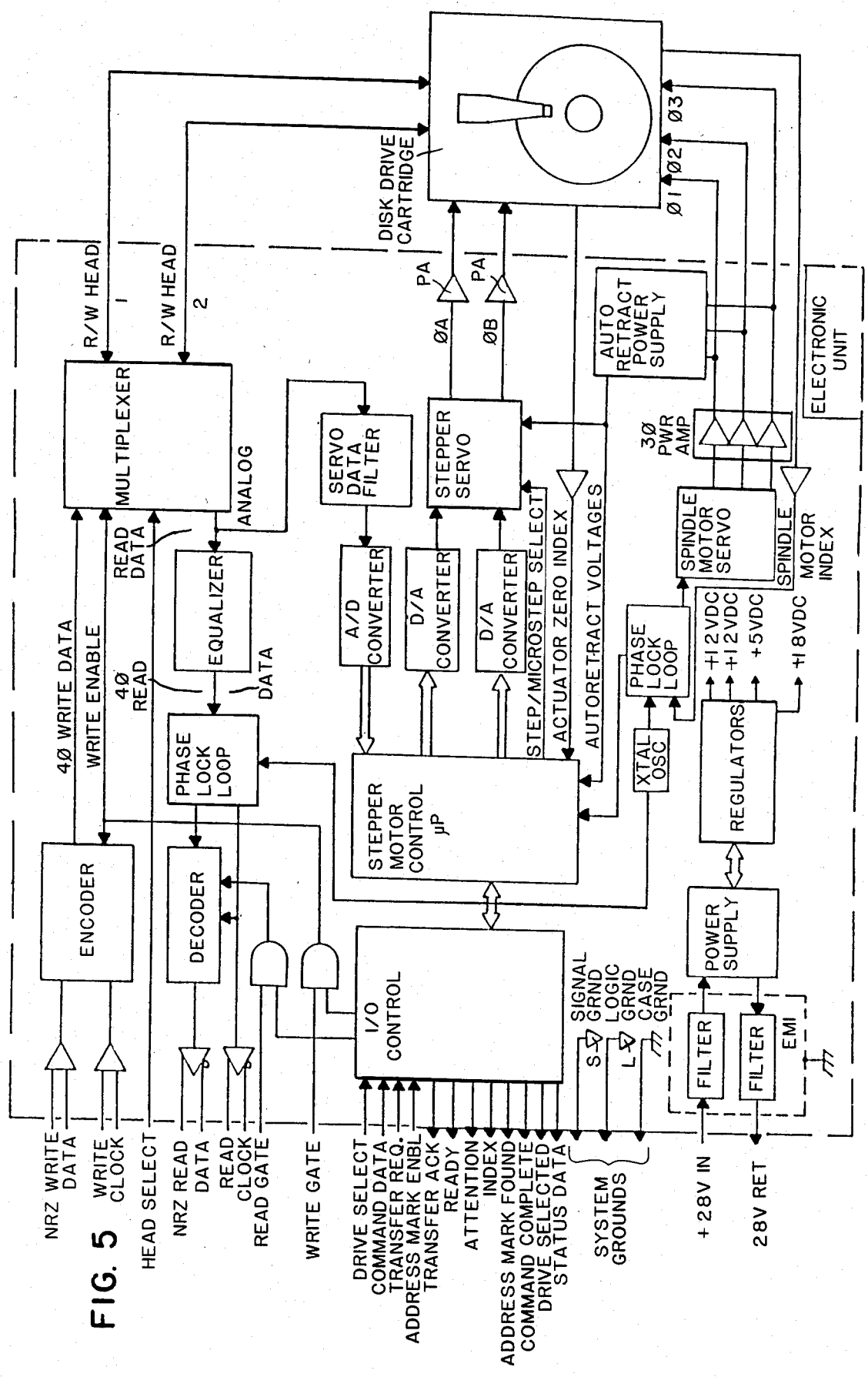
FIG. 5 is a block diagram of an electrical control system suitable for operating the unit of the present invention.

FIG. 5 shows a block diagram of an electronic control system suitable for use with the unit of the present invention. As shown in FIG. 5, power is initially delivered to the power supply and regulators 200 through EMI filters 202. Upon receipt of a "start spindle" command from the stepper motor control microprocessor 201 through the I/O and interface control logic 203, the read/write head 48 automatically moves from the landing pad 96 to a preselected location on the disc. Next, the spindle servo 204 generates a drive signal to spindle driver 206 which supplies three phase power to spindle motor 37 causing motor 37 to rotate. The speed of spindle motor 37 is synchronized to the spindle servo 204 via the spindle zero index 208 signal and the crystal oscillator 210 frequency. The spindle zero index signal is generated by the zero index magnetic sensor 116. Thus, at this point, the spindle motor is rotating at a desired speed and the read/write head 48 is at a preselected location over the disc.

The electronics which controls the operation of the read/write mechanism is as follows: Upon receipt of a preselected command, a signal proportional to the distance to be traveled (by the read/write head 48) is generated by microprocessor 201 and converted to an analog format by the D/A converters 212 and 214 whereby the signals are transmitted to the stepper motor 86 via the stepper servo and driver 216. As a result, the read/write head 48 will have been moved to the commanded position over a pre-selected track or cylinder of the disc 24. Once the commanded position is acquired, a unique servo pattern which is embedded in the track or cylinder of disc 24 is detected by the track follow servo 218, reformatted by the A/D converter 220 and processed by microprocessor 201 to maintain (or align) the head position in the center of that disc track. This precludes any undesirable off-track drift by read/write head 48 and resultant problems during subsequent read/write functions.

At this point, transfers of data to and from disc 24 is accomplished by the read and write electronic circuits. Writing data to disc 24 is effected by translating the data from NRZ (non return to zero) to MFM (modified frequency modulation) through the encoder 222 and applying the transformed data to the selected read/write head 48 via the write multiplexer circuitry contained in the magnetic disc unit electronics identified as "Write Driver Mux" in FIG. 5 (and also identified at 125 in FIG. 2). Reading data from disc 24 is accomplished by preamplication using the read preamplifier (identified as "Read Preamp" in FIG. 5 and identified generally as 125 in FIG. 2) and filtering by the equalizer 224. The data is then translated from MFM to NRZ by the decoder 226. Read clock generation is accomplished by the phase lock loop 228.

During the event of a power interruption of any kind (as discussed earlier), the read/write head 48 and carriage 54 are returned to the fully retacted position on landing pad 96. This automatic retraction is initiated when microprocessor 201 detects any of the aforementioned power interruption states (such as when magnetic switch 108 is actuated by latch 26). When a power interruption is detected, microprocessor 201 will transmit motion signals via D/A converters 212, 214 and stepper servo and driver 216 to the stepper motor 86 causing the read/write head 48 to automatically withdraw to the landing pad. Power to control the automatic retraction of head 48 is derived from the spindle motor 37, acting as a generator (as discussed in detail above). Thus, a signal is sent from the auto retract power supply 230 to the microprocessor 201, D/A converter 212, 214 and stepper servo and driver 216 via the spindle servo 204. The auto retraction function is completed upon receipt of the retract signal (such as from switch 108 which is actuated by latch 26) by the microprocessor 201.

While preferred embodiments have been shown and described, vrious modifications and substitutions may be made thereto without departing from the spirit and scope of the invention. Accordingly, it is to be understood that the present invention has been described by way of illustrations and not limitation.

What is claimed is:

1. A magnetic disc memory unit comprising: housing means having an inside and an outside; means for rotatably driving said disc supporting means; read/write head means; head carriage means supporting said read/write head means;

first means for moving said head carriage means and said read/write head means back and forth in a first linear direction between a retracted position and a preselected position relative to a disc mounted on said disc supporting means wherein said first linear direction is radial or parallel to a radial line with respect to a disc mounted on said disc supporting means;

stepper motor means connected to said first moving means for driving said head carriage means and said read/write head means in said linear direction between said retracted position and said preselected position;

counter balance assembly means for counter balancing the weight of said head carriage means and said read/write head means;

second means for moving said counter balance assembly means in a second linear direction, said second linear direction being equal and opposite to said first linear direction wherein said first means for moving is coordinated with said second means for moving;

said counter balance assembly means having a weight about equal to the weight of said head carriage means and said read/write head means;

wherein said first means for moving said head carriage means comprises;

first and second parallel guide rods;

first and second block means for supporting opposed ends of said first and second parallel guide rods in said housing means;

second bearing means mounted on said first and second parallel guide rods; and said head carriage means being attached to said second bearing means whereby said carriage means is movable in said first linear direction along and between said first and second guide rods; and wherein said second means for moving said counter balance assembly means comprises;

a third guide rod parallel to said first and second guide rods;

said third guide rod having opposed ends supported in said first and second block means;

third bearing means mounted on said second and third parallel guide rods; and said counter balance assembly means being attached to said third bearing means whereby said counter balance assembly means is movable in said second linear direction along and between said second and third parallel guide rods.

2. The unit of claim 1 wherein said disc supporting means comprises:

a rotary plate having a rotary spindle extending therefrom, said rotary spindle being mounted in and supported in first bearing means; and a top plate, said top plate being releasably fastened to said rotary plate whereby a disc is supported and secured between said rotary plate and said top plate.

3. The unit of claim 2 wherein said disc driving means comprises:

a motor, said motor including a stator and rotor, said stator being mounted on said housing and said rotor being mounted to a skirt on said rotary plate.

4. The unit of claim 1 wherein said first means for moving said head carriage means comprises:

first and second parallel guide rods;

first and second block means for supporting opposed ends of said first and second parallel guide rods in said housing means;

second bearing means mounted on said first and second parallel guide rods; and said head carriage means being attached to said second bearing means whereby said carriage means is movable in said first linear direction along and between said first and second parallel guide rods.

5. The unit of claim 1 including:

a continuous drive belt connecting said head carriage means and said counter balance assembly means with said stepper motor means.

6. The unit of claim 1 wherein said read/write head means comprises:

at least one magnetic pick-up head;

a flexure beam having said magnetic pick-up head attached to a first end thereof; and a support plate, said support plate being attached to a second end of said flexure beam, said support plate also being attached to said head carriage means.

7. The unit of claim 6 including:

means for supporting said magnetic head when said read/write head means is in a retracted position; and means for raising and lowering said flexure beam as said read/write head means moves back and forth between said retracted position and said preselected position.

8. The unit of claim 7 wherein said means for raising and lowering said flexure beam includes:

cam follower means on said flexure beam; and a step on said means for supporting said magnetic head wherein said cam follower contacts said step and raises said flexure beam in a first direction and lowers said flexure beam in a second opposite direction.

9. The unit of claim 8 wherein:

said cam follower means has a spherical or semispherical shape.

10. The unit of claim 1 wherein:

said housing means is hermetically sealed.

11. The unit of claim 10 including:

an inert gas in said hermetically sealed housing.

12. The unit of claim 11 including:

filter means in said housing means for filtering said inert gas.

13. The unit of claim 1 including:

electro-optic sensor means in said housing means for generating an optical path;

flag means on said head carriage means for interrupting said optical path of said electro-optic sensor means when said head carriage means and said read/write head means are in a retracted position whereby said electro-optic sensor means generates an output signal to terminate operation of said stepper motor means.

14. The unit of claim 1 wherein:

said disc supporting means includes a skirt, said skirt being comprised of a magnetic material, said skirt having a preselected gap therein defining an index notch;

and wherein said unit further includes:

zero index magnetic sensor means which interacts with said skirt to sense the change in magnetic path at said index notch.

15. The unit of claim 1 including:

latch means on the outside of said housing means for locking and unlocking said housing means from a cardle which receives said housing means; and switch means cooperating with said latch means whereby power to said unit is shut down when said latch means is actuated.

16. The unit of claim 1 including:

means for transforming said disc supporting means driving means to a power generator for producing electrical power to power said stepper motor means whereby said head carriage means and said read/write head means are moved into said retracted position during power interruption to said unit.

17. A magnetic disc memory unit comprising:

housing means having an inside and an outside;

means for supporting a disc inside said housing means;

means for rotatably driving said disc supporting means;

read/write head means;

first carriage means supporting said read/write head means;

first means for moving said head carriage means and said read/write head means back and forth in a first linear direction between a fully retracted position and a preselected position relative to a disc mounted on said disc supporting means wherein said first linear direction is radial or parallel to a radial line with respect to a disc mounted on said disc supporting means;

stepper motor means connected to said moving means for driving said head carriage means and said read/write head means in said linear direction between said fully retracted position and said preselected position;

means for transforming said disc supporting means driving means to a power generator for producing electrical power to power said stepper motor means whereby said head carriage means and said read/write head means are moved into said fully retracted position during power interruption to said unit; and storing and protecting means for storing and protecting said read/write head means, said read/write head means being supported by said storing and protecting means when said read/write head means is moved into said fully retracted position.

18. The unit of claim 17 wherein said disc supporting means comprises:
   a rotary plate having a rotary spindle extending therefrom, said rotary spindle being mounted in and supported in first bearing means; and
   a top plate, said top plate being releasably fastened to said rotary plate whereby a disc is supported and secured between said rotary plate and said top plate.

19. The unit of claim 18 wherein said disc driving means comprises:
   a motor, said motor including a stator and rotor, said stator being mounted on said housing and said rotor being mounted to a skirt on said rotary plate.

20. The unit of claim 17 wherein said first means for moving said head carriage means comprises:
   first and second parallel guide rods;
   first and second block means for supporting opposed ends of said first and second parallel guide rods in said housing means;
   second bearing means mounted on said first and second parallel guide rods; and
   said head carriage means being attached to said second bearing means whereby said carriage means is movable in said first linear direction along and between said first and second parallel guide rods.

21. The unit of claim 17 including:
   counter balance assembly means for counter balancing the weight of said head carriage means and said read/write head means;
   second means for moving said counter balance assembly means in a second linear direction, said second linear direction being equal and opposite to said first linear direction wherein said first means for moving is coordinated with said second means for moving; and
   said counter balance assembly means having a weight about equal to the weight of said head carriage means and said read/write head means.

22. The unit of claim 21 wherein said first means for moving said head carriage means comprises:
   first and second parallel guide rods;
   first and second block means for supporting opposed ends of said first and second parallel guide rods in said housing means;
   second bearing means mounted on said first and second parallel guide rods; and
   said head carriage means being attached to said second bearing means whereby said carriage means is movable in said first linear direction along and between said first and second parallel guide rods.

23. The unit of claim 22 wherein said second means for moving said counter balance assembly means comprises:
   a third guide rod parallel to said first and second guide rods;
   said third guide rod having opposed ends supported in said first and second block means;
   third bearing means mounted on said second and third parallel guide rods; and
   said counter balance assembly means being attached to said third bearing means whereby said counter balance assembly means is movable in said second linear direction along and between said second and third parallel guide rods 24. The unit of claim 21 including:
   a continuous drive belt connecting said head carriage means and said counter balance assembly means with said stepper motor means.

* * * * *

UNITED STATES PATENT AND TRADEMARK OFFICE
CERTIFICATE OF CORRECTION

PATENT NO.  : 4,791,508

DATED       : Dec. 13, 1988

INVENTOR(S) : James A. Augeri, et al

It is certified that error appears in the above-identified patent and that said Letters Patent is hereby corrected as shown below:

| | |
|---|---|
| Col. 3, line 63 | Delete "motor 6" and insert therefore --motor 86--. |
| Col. 4, line 28 | After "air gap in the magnetic" and before "path", insert -- iron skirt 44. Sensor 116 thus senses the change in a magnetic --. |
| Col. 6, line 26 | After "inside and an outside;" insert means for supporting a disc inside said housing means;--. |
| Col. 8, line 30 | Delete "cardle" and insert therefore --cradle--. |

Signed and Sealed this

Twenty-first Day of September, 1993

Attest:

BRUCE LEHMAN

*Attesting Officer*          *Commissioner of Patents and Trademarks*